(12) United States Patent
Johnston et al.

(10) Patent No.: US 10,501,174 B2
(45) Date of Patent: Dec. 10, 2019

(54) MOUNTING PLATES FOR ROTOR HUB ACCESSORIES

(71) Applicant: Sikorsky Aircraft Corporation, Stratford, CT (US)

(72) Inventors: Stephen Johnston, Fort Worth, TX (US); James Mccollough, Arlington, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 350 days.

(21) Appl. No.: 15/406,206

(22) Filed: Jan. 13, 2017

(65) Prior Publication Data
US 2019/0009896 A1    Jan. 10, 2019

Related U.S. Application Data

(60) Provisional application No. 62/279,541, filed on Jan. 15, 2016.

(51) Int. Cl.
| | |
|---|---|
| *B64C 27/32* | (2006.01) |
| *B64C 11/02* | (2006.01) |
| *B64C 27/02* | (2006.01) |
| *B64C 27/10* | (2006.01) |

(52) U.S. Cl.
CPC ............ *B64C 27/322* (2013.01); *B64C 11/02* (2013.01); *B64C 27/021* (2013.01); *B64C 27/028* (2013.01); *B64C 27/10* (2013.01); *B64C 27/327* (2013.01)

(58) Field of Classification Search
CPC ..... B64C 27/001; B64C 27/32; B64C 27/322; B64C 2027/003; B64C 11/02; B64C 11/14; B64C 27/327
USPC .................................................. 416/133, 140
See application file for complete search history.

(56) References Cited

U.S. PATENT DOCUMENTS

| | | | |
|---|---|---|---|
| 1,934,668 A | * | 11/1933 | Havill .................. B64C 11/346 416/133 |
| 5,452,157 A | | 9/1995 | Chow et al. |
| 7,354,248 B2 | | 4/2008 | Zinni |
| 7,730,763 B2 | | 6/2010 | Kohei et al. |

* cited by examiner

*Primary Examiner* — Kenneth Bomberg
*Assistant Examiner* — Andrew Thanh Bui
(74) *Attorney, Agent, or Firm* — Cantor Colburn LLP

(57) ABSTRACT

A rotor hub assembly includes an open rotor hub assembly with an open rotor hub and a mounting plate. The open rotor hub includes an annular base portion with periphery and a plurality of rotary member portions arranged about the annular base portion that each define an aperture for receiving a rotor blade. The mounting plate spans the annular base portion and is coupled to the annular base portion by a resilient member to accommodate radially expansion and contraction of the annular base portion according to loads exerted on the rotor hub by rotor blades seated in the apertures of the rotary member portions.

14 Claims, 4 Drawing Sheets

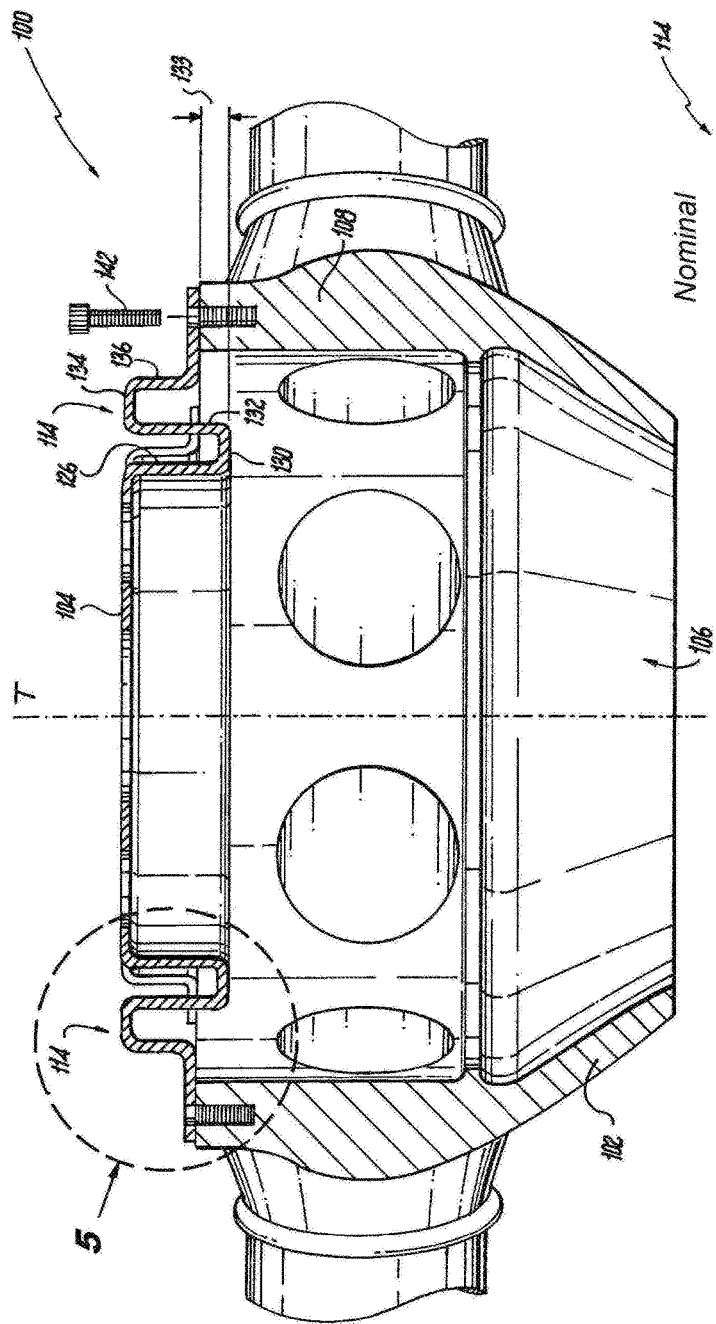
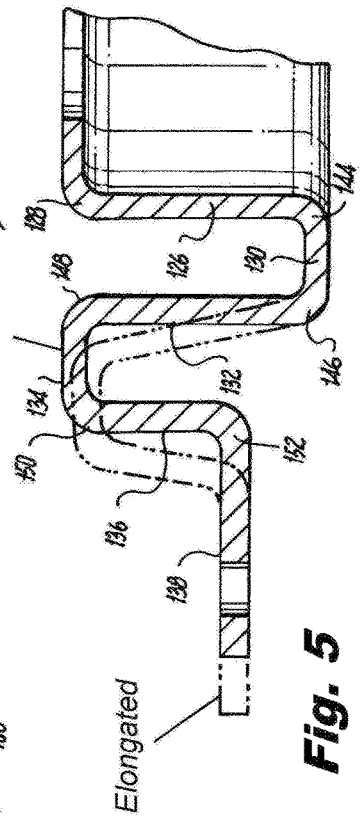
Fig. 4
Fig. 5

MOUNTING PLATES FOR ROTOR HUB ACCESSORIES

CROSS-REFERENCE TO RELATED APPLICATION

This application claims the benefit of priority under 35 U.S.C. § 119(e) to U.S. Provisional Application No. 62/279,541, filed Jan. 15, 2016, which is incorporated herein by reference in its entirety.

STATEMENT REGARDING FEDERALLY SPONSORED RESEARCH OR DEVELOPMENT

This invention was made with government support under Contract No. W911W6-13-2-0003 awarded by the United States Army. The government has certain rights in the invention.

BACKGROUND OF THE INVENTION

1. Field of the Invention

The present disclosure relates to rotor systems, and more particularly to mounting plates for open hubs of rotorcraft rotor systems.

2. Description of Related Art

Rotorcraft commonly employ rotor systems with rotor blades coupled to a central hub for common rotation with the hub about a rotation axis. Because the rotor hub is the primary structural element for applying torque to each of the rotor blades of the rotor system, balancing loads between opposing rotor blades of the rotor system, and transferring lift or thrust loads to the aircraft fuselage, the rotor hub geometry and structure is typically defined to accommodate the loads exerted on the rotor hub during operation. In rotorcraft having blade retention and/or control components disposed within the rotor hub interior, such as pitch control rods for controlling rotor blade angle of attack, the rotor hub can be open on an axial end to provide access to the components for inspection, maintenance, and/or replacement. Such open rotor hubs can elongate and contract during rotation, exerting stress on components carried by the rotor hub.

Such conventional methods and systems have generally been considered satisfactory for their intended purpose. However, there is still a need in the art for improved accessory mounting brackets that allow for improved load distribution within the rotor system hub. The present disclosure provides a solution for this need.

SUMMARY OF THE INVENTION

A rotor assembly includes a rotor hub with open end and a mounting plate spanning the open end. The rotor hub includes an annular base portion with periphery and a plurality of rotary member portions arranged about the annular base portion defining respective apertures to receive a rotor blade. The mounting plate includes one or more resilient members coupling the mounting plate the annular base portion of the rotor hub to accommodate radially expansion and contraction of the annular base portion from loads exerted on the rotor hub by rotor blades seated coupled to the rotary member portions.

In certain embodiments, the mounting plate can include one or more apertures extending through the mounting plate. The resilient member can include a plurality of axial segments. The axial segments can be disposed between the mounting plate and the periphery of the rotor hub annular base portion. One or more of the plurality of axial segments can overlap a portion of the periphery of the rotor hub annular base portion. One or more of the plurality of axial segments can be disposed external or internal to the rotor hub annular base portion.

In accordance with certain embodiments, the resilient member can include a plurality of radial segments. The plurality of radial segments can be disposed between the mounting plate and the periphery of the rotor hub annular base portion. One or more of the plurality of radial segments can overlap the periphery of the rotor hub annular base portion. One or more of the plurality of radial segments can be disposed external or internal to the periphery of the rotor hub annular base portion.

It is contemplated that, in accordance with certain embodiments, the resilient member can include a foot segment. The foot segment can be connected to the periphery of the rotor hub annular base portion radially outward of the mounting plate. The resilient member can be a first resilient member, and the mounting plate can include at least one second resilient member. The at least one second resilient member can be disposed on a side of the mounting plate opposite the first resilient member. For example, a second resilient member can be radially opposite from the first resilient member.

It also contemplated that, in accordance with certain embodiments, the resilient member can include a plurality of arcuate segments. The plurality of arcuate segments can be disposed between the mounting plate the rotor hub periphery. One or more of the plurality of arcuate segments can be disposed of external or internal to the rotor hub. One or more of the plurality of arcuate segments can be disposed within the periphery of the rotor hub annular base portion. An arcuate segment can couple the mounting plate to a first radial segment of the resilient member. An arcuate segment can couple the first radial segment of the resilient to a first axial segment of the resilient member. An arcuate segment can couple the first axial segment of the resilient member to a second radial segment of the resilient member. An arcuate segment can couple the second radial segment of the resilient member to a second axial segment of the resilient member. One of the resilient members can couple the second axial segment of the resilient member to the foot of the resilient member. The plurality of arcuate segments can have minimum thicknesses that are greater than minimum thicknesses of the radial and axial segments of the resilient member.

A rotary wing aircraft includes an airframe and a rotor system rotatably supported by the airframe for rotation about a rotation axis. The rotor system includes a rotor shaft arranged along the rotation axis. The rotor shaft is connected to a rotor hub assembly as described above and includes a rotor blade seated in each of the rotary member portions. The mounting plate can have the same number of resilient members as the hub has rotary member portions. The mounting plate can have a greater number of resilient members than the hub has rotary member portions. In embodiments, each resilient member can be connected to the rotor hub periphery between circumferentially adjacent rotary member portions. In certain embodiments, each resilient member can be connected to the rotor hub periphery such that each resilient member shares a common radial position with a rotary member portion.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a cross-sectional side view of the mounting plate and rotor hub of the rotor hub assembly of FIG. 2, showing the elements of opposed resilient members of the mounting plate; and FIG. 5 is a side elevation view of the resilient member of the mounting plate shown in FIG. 1, showing the arcuate segments connecting the axial and radial segments of the resilient member to one another.

DETAILED DESCRIPTION OF THE PREFERRED EMBODIMENTS

Figure 1:
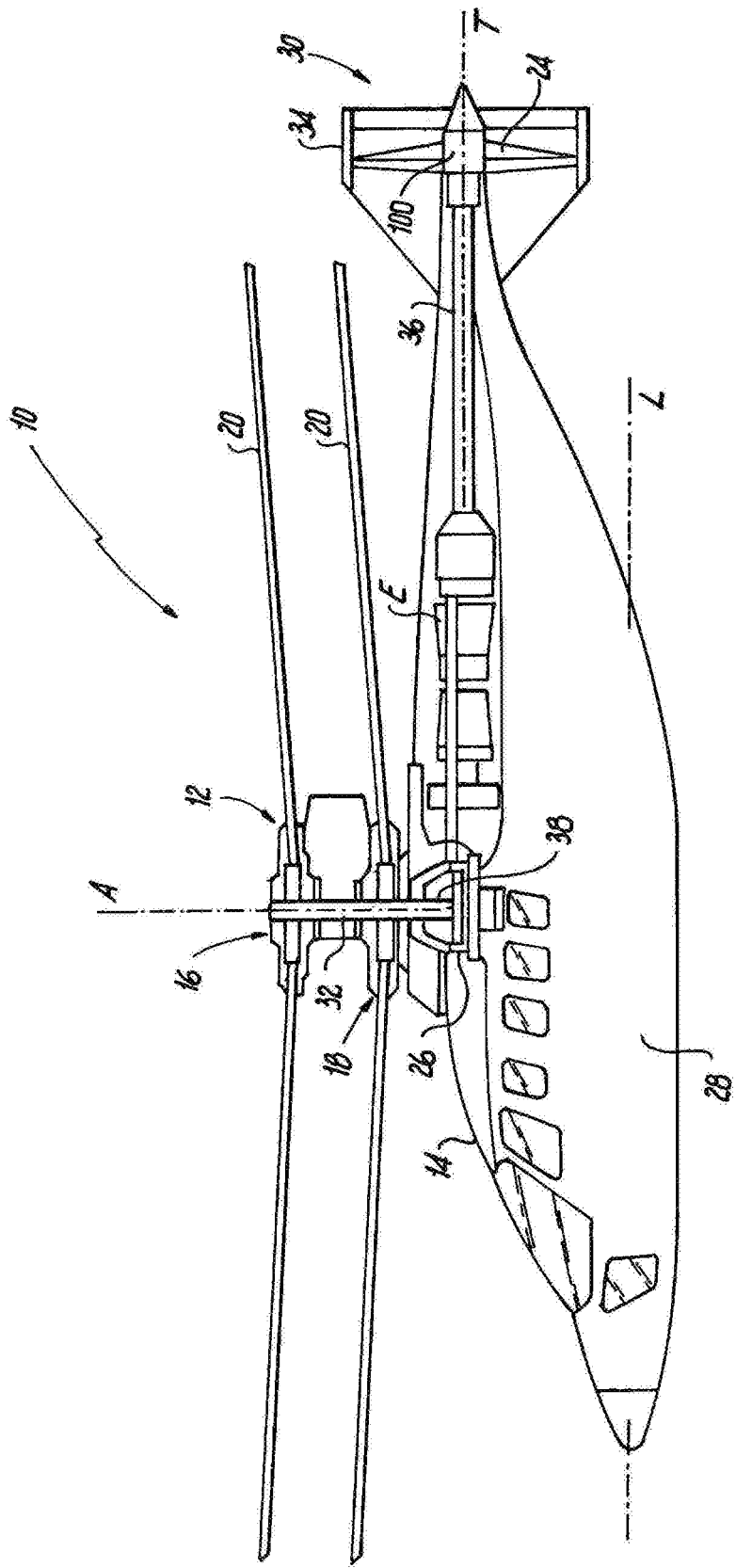
FIG. 1 is a schematic side elevation view of an exemplary embodiment of a rotorcraft constructed in accordance with the present disclosure, showing a rotor hub assembly.

Reference will now be made to the drawings wherein like reference numerals identify similar structural features or aspects of the subject disclosure. For purposes of explanation and illustration, and not limitation, a partial view of an exemplary embodiment of a rotor hub assembly in accordance with the disclosure is shown in FIG. 1 and is designated generally by reference character 100. Other embodiments of mounting plates and rotor systems in accordance with the disclosure, or aspects thereof, are provided in FIGS. 2-5, as will be described. The systems and methods described herein can be used in rotorcraft rotor systems, however the invention is not limited to a particular type of rotorcraft or to aircraft in general.

With reference to FIG. 1, a rotorcraft 10 is shown. In the illustrated exemplary embodiment, rotorcraft 10 is a vertical takeoff and landing (VTOL) rotorcraft with a dual, contra-rotating, coaxial rotor system 12. Rotorcraft 10 includes an airframe 14, which supports rotor system 12 for rotation about a rotation axis A. Rotor system 12 includes an upper rotor assembly 16 and a lower rotor assembly 18. Upper rotor assembly 16 and lower rotor assembly 18 both include a plurality of rotor blades 20 mounted for rotation about a rotor axis of rotation A. An upper rotor shaft 32 rotatably drives upper rotor assembly 16 about rotation axis A and a lower rotor shaft 38 drives lower rotor system 18 about rotation axis A. A main gearbox 26, which may be located above the aircraft cabin 28, drives coaxial rotor system 12 through upper rotor shaft 32 and lower rotor shaft 38.

A translational thrust system 30, e.g., a propulsor, is supported for rotation about a thrust axis T. Translational thrust system 30 may be mounted to the rear of airframe 14 with a thrust axis T oriented substantially horizontal and parallel to the aircraft longitudinal axis L to provide thrust for high-speed flight. Translational thrust system 30 includes a rotor hub assembly 100 with a plurality of rotor blades mounted within an aerodynamic cowling 34. Translational thrust system 30 may be driven by main gearbox 26 through a propulsor shaft 36, which is turn is driven by one or more engines E. Main gearbox 26 may be interposed between the gas turbine engines E, rotor system 12, and translational thrust system 30. Although a particular aircraft configuration is illustrated in this non-limiting embodiment, other contra-rotating, coaxial rotor systems, non-coaxial helicopters, and any other type of rotorcraft will also benefit from aspects of the present invention. While propulsor rotor hub assembly 100 is described herein as an element of translational thrust system 30, it is to be appreciated that rotor system 12 may alternatively or additionally include one or more rotor hub assemblies as further described below.

Figure 2:
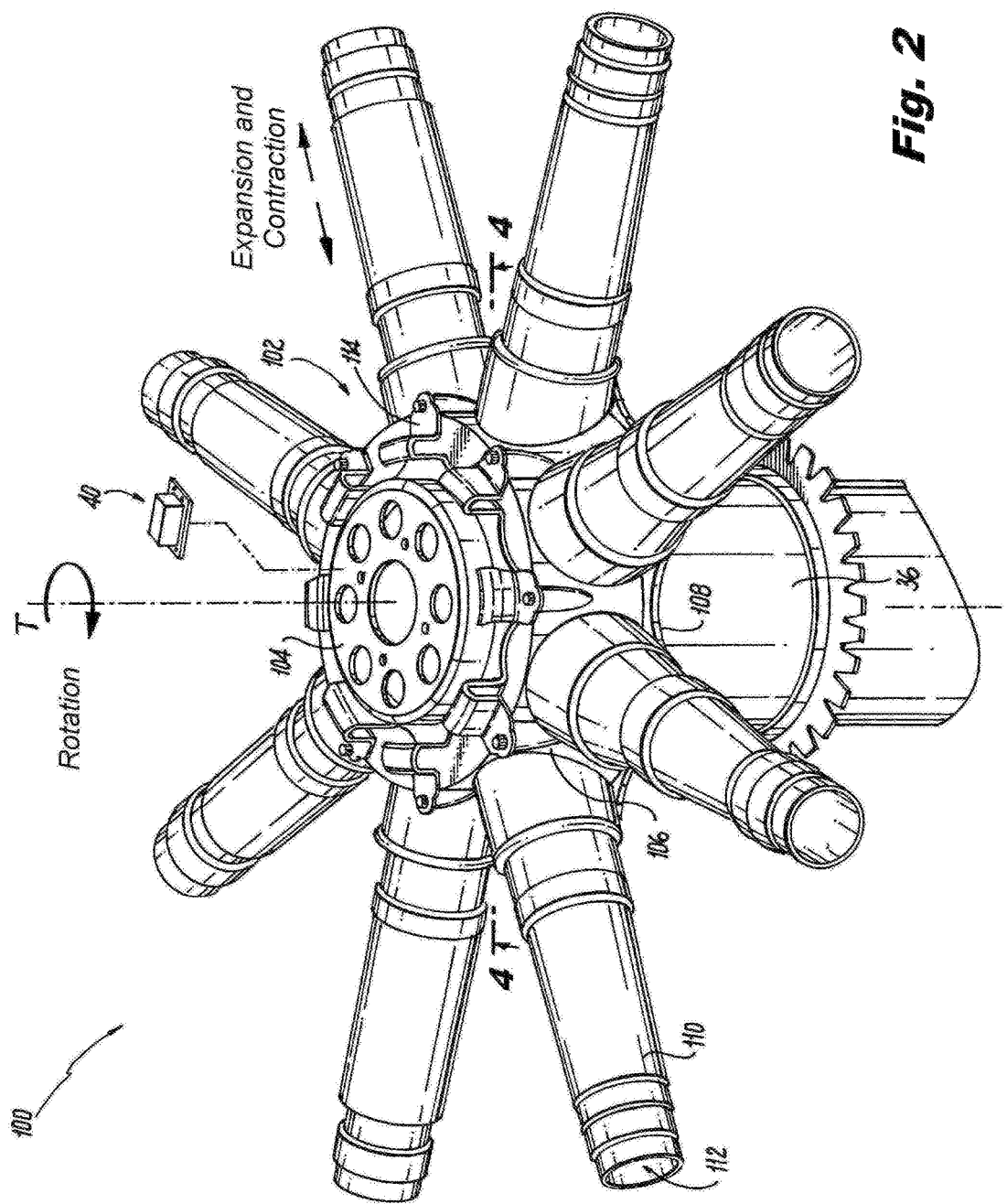
FIG. 2 is a perspective view of the rotor hub assembly of the rotorcraft of FIG. 1, showing an open rotor hub with a mounting plate.

With reference to FIG. 2, rotor hub assembly 100 is shown. Rotor hub assembly 100 includes an open rotor hub 102 and a mounting plate 104. Open rotor hub 102 has an annular base portion 106, a periphery 108, and a plurality of rotary member portions 110 arranged about periphery 108 and extending laterally therefrom relative to thrust axis T. Each rotary member portion 110 defines an aperture 112 opening radially inward into open rotor hub 102 that seat rotor blade 24. Propulsor shaft 36 couples to open rotor hub 102 on an end axially opposite mounting bracket 100 for rotating rotor hub assembly 100 about thrust axis T. In the illustrated exemplary embodiment open rotor hub 102 includes eight (8) rotary member portions 110. It is contemplated that open rotor hub 102 can have fewer or more rotary member portions, as suitable for a given application.

Mounting plate 104 spans annular base portion 106 and includes a plurality of resilient members 114 arranged about the circumference of mounting plate 104. Each resilient member 114 couple mounting plate 104 to annular base portion 106 of open rotor hub 102 and are configured and adapted to stretch and contract, i.e. flex, in the radial direction according to expansion and contraction of the open rotor hub 102. As will be appreciated by those of skill in the art in view of the present disclosure, dynamic loads associated with rotation of propulsor rotor hub assembly 100 about rotation axis A can cause open rotor hub 102 to radially stretch and contract under flight loadings. Resilient member 114 radially deforms by moving between a nominal position (shown in FIG. 5) and an elongated position (shown in FIG. 5) in concert with radial expansion and contraction cycles (shown in FIG. 2) of open rotor hub 102, thereby reducing the shear force that the fasteners coupling mounting plate 104 to open rotor hub 102 apply to mounting plate 104. This allows mounting plate 104 and/or the fasteners coupling mounting plate 104 to open rotor hub 102 to be less massive than would ordinarily be required to accommodate the loads exerted by open rotor hub 102 on mounting plate 104 due to cyclic stretching and contraction of open rotor hub 102 under flight loadings. It also isolates a mounted device 40 coupled to mounting plate 104. It is contemplated that mounting plate 104 can carry a mounted device 40 that includes one or more of an ice protection system power distributor, an ice protection system controller, a telemetry data transmitting system, or any other mounted device requiring attachment to open rotor hub 102.

Figure 3:
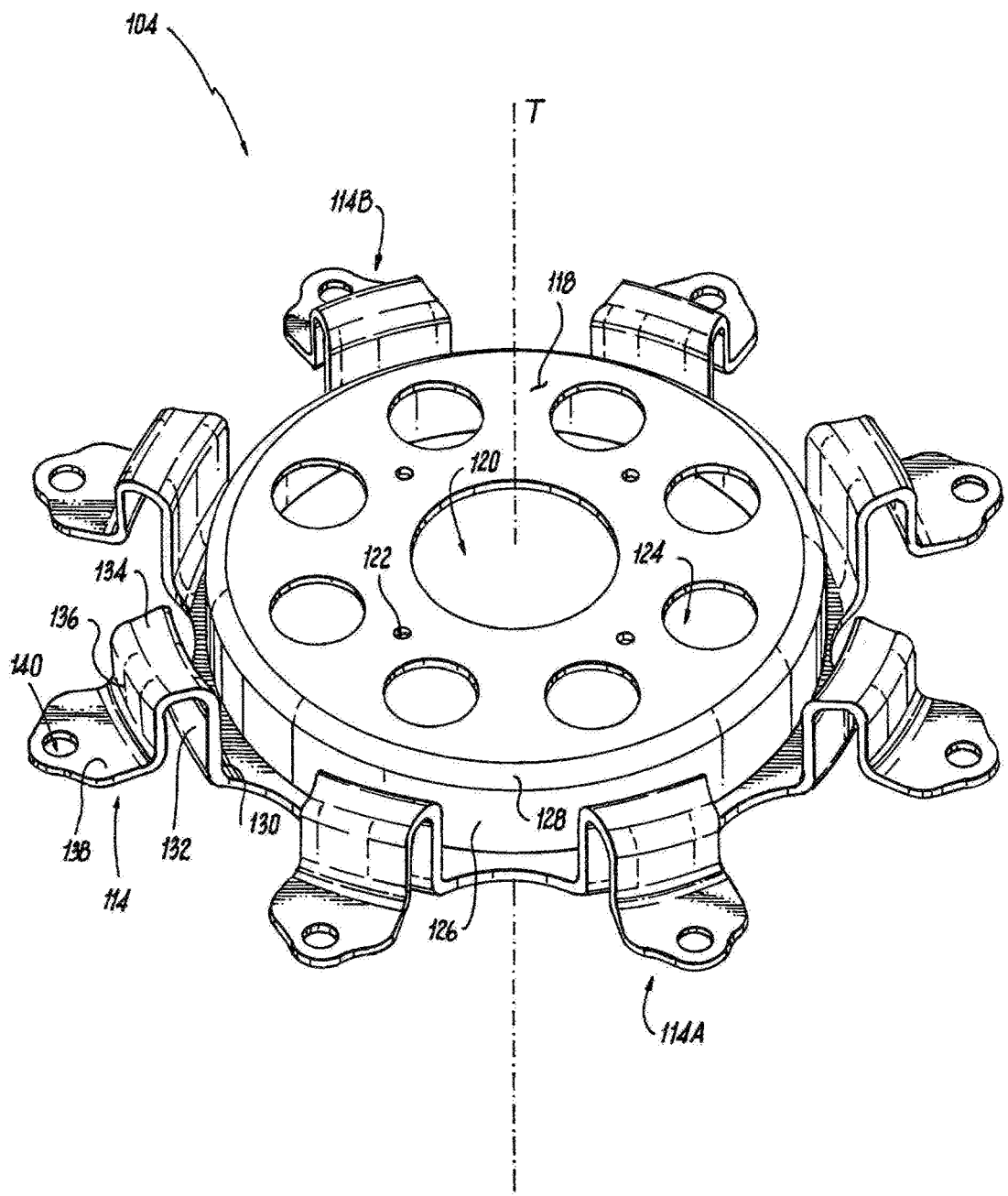
FIG. 3 is a perspective view of the mounting plate of the rotor hub assembly shown in FIG. 2, showing resilient members of the mounting bracket arranged about the periphery of the mounting bracket.

With reference to FIG. 3, mounting plate 104 is shown. Mounting plate 104 includes a module carrying surface 118. In the illustrated exemplary embodiment module carrying surface 118 defines a central aperture 120, a plurality of module mounting fastener apertures 122, and a plurality of lightening apertures 124. Exemplary central aperture 120 extends about thrust axis T. Exemplary module mounting fastener apertures 122 are arranged according to a fastener pattern of mounted device 40 (shown in FIG. 2) carried by mounting plate 104. Exemplary lightening apertures 124 are circumferentially distributed about module carrying surface 118 between the resilient members and central aperture 120, reducing the weight of mounting plate 104. As will be appreciated by those of skill in the art in view of the present disclosure, central aperture 120 is optional, other fastener patterns of fastener devices may be utilized in place of exemplary fastener apertures 122, and fewer or more lightening apertures 124 may be defined by module carrying surface 118.

Mounting plate 104 includes a rim 126. Rim 126 is connected to module carrying surface 118 by an arcuate segment 128, which extends about a circumferential periphery if mounting plate 104. Rim 126 and arcuate segment 128 cooperate to stiffen mounting plate 104 in the radial direction. This reduces the tendency of module carrying surface 118 to stretch and confines deformation to the resilient members by rendering mounting plate 104 more stiff (rigid) in the radial direction. Accordingly, resilient members disposed on radially opposite sides of mounting plate 104, e.g., a first resilient member 114A and a second resilient member 114B, preferentially deform according to elongation and contraction of open rotor hub 102 (shown in FIG. 2), mounting plate 104 thereby maintaining a relatively constant diametric dimension. It is to be appreciated and understood that mounting plate 104 can include fewer or more resilient members than illustrated in FIG. 2, as suitable for an intended application. Further, by adjusting the thickness and/or the shape of the segments, resilient members 114 can be shaped to tune the dynamic response of mounting plate 104 according vibrational forces experienced at open rotor hub 102.

In the illustrated exemplary embodiment, resilient member 114 includes a first radial segment 130, a first axial segment 132, a second radial segment 134, and a second axial segment 136. First radial segment 130 is connected to rim 126 on a radially inner end. First axial segment 132 is connected to a radially outer end of first radial segment 130. Second radial segment 134 is connected to first axial segment 132 on an axially lower end. Second axial segment 136 is connected to second radial end on an axially upper end. A foot segment 138 with a fastener aperture 140 is connected to second axial segment 136 on an axially lower end of second axial segment 136. Fastener aperture 140 is configured to receive a fastener 142 (shown in FIG. 4).

With reference to FIG. 4, propulsor rotor hub assembly 100 is shown. First axial segment 132 and second axial segment 136 are disposed radially between mounting plate 104 and periphery 108 of open rotor hub 102. A portion 133 of first axial segment 132 axially overlaps periphery 108 of open rotor hub 102. Second axial segment 136 is disposed externally of open rotor hub 102, i.e. over open rotor hub 102 relative to the top of the drawing sheet.

First radial segment 130 and second radial segment 134 are disposed radially between mounting plate 104 and periphery 108 of open rotor hub 102. First radial segment 130 axially overlaps periphery 108 of open rotor hub 102. Second radial segment 134 is disposed externally of open rotor hub 102, i.e. over open rotor hub 102 relative to the top of the drawing sheet. This gives resilient member 114 an accordion-like structure, allowing a relatively large portion of module carrying surface 118 (shown in FIG. 3) to be available for rotor hub assemblies in comparison to the area occupied by the resilient members.

With reference to FIG. 5, resilient member 114 is shown. Resilient member 114 includes a plurality of arcuate segments interposed between a radially inner end of resilient member 114 and foot segment 138. In this respect resilient member 114 includes a first arcuate segment 144, a second arcuate segment 146, a third arcuate segment 148, a fourth arcuate segment 150, and a fifth arcuate segment 152. First arcuate segment 144 connects rim 126 with first radial segment 130 of resilient member 114. Second arcuate segment 146 connects first radial segment 130 with first axial segment 132 of resilient member 114. Third arcuate segment 148 connects first axial segment 132 of resilient member 114 with second radial segment 134 of resilient member 114. Fourth arcuate segment 150 connects second radial segment 134 of resilient member 114 with second axial segment 136 of resilient member 114. Fifth arcuate segment 152 connects second axial segment 136 of resilient member 114 with foot segment 138 of resilient member 114.

In certain embodiments, each of the arcuate segments, i.e. arcuate segments 144-152, have minimum thicknesses that are greater than the respective minimum thicknesses of the radial segments and axial segments of the respective resilient member 114. This causes the deformation of resilient member 114 associated with the elongation and contraction of open rotor hub 102 (shown in FIG. 4) to be confined within the axial and radial segments of resilient member 114. This facilitates movement of resilient member 114 between nominal position and an elongated position according to expansion and contraction or open rotor hub 102 (shown in FIG. 2), enabling module carrying surface 118 to maintain a constant position along rotation axis A (shown in FIG. 4) notwithstanding the forces exerted on resilient member 114.

As will appreciated by those of skill in the art in view of the present disclosure, radially opposed resilient members, e.g., first resilient member 114A (shown in FIG. 3) and second resilient member 114B (shown in FIG. 3) may move in concert with one another between the nominal and elongated positions (shown in FIG. 5) according to expansion and contraction of open rotor hub 102 (shown in FIG. 2). As will also be appreciated, while a specific number axial, radial, and arcuate segments are shown in the illustrated exemplary embodiment, it is understood that the resilient member 114 can have other numbers of segments, and that other shapes can be used which allow the resilient member 114 to stretch with the open rotor hub 102 without deforming the mounting surface 118.

The methods and systems of the present disclosure, as described above and shown in the drawings, provide for rotor hub assemblies with superior properties including reduced shear load transmission from the rotor hub into the mounting plate through fasteners coupling the mounting plate to the rotor hub. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor hub assembly, comprising:
   an open rotor hub including:
      an annular base portion with a periphery; and a plurality of rotary member portions arranged about the periphery of the annular base portion, each rotary member portion defining an aperture for receiving a rotor blade; and a mounting plate comprising a central aperture and a resilient member, the mounting plate spanning the annular base portion and coupled to the annular base portion by the resilient member, the resilient member being configured to expand and contract in a radial direction with respect to the central aperture with the annular base portion according to a dynamic loading of the rotor hub.

2. The rotor hub assembly as recited in claim 1, wherein the resilient member includes a plurality of arcuate segments disposed between the mounting plate and the rotor hub periphery.

3. The rotor hub assembly as recited in claim 2, wherein one or more of the plurality of the arcuate segments are disposed outside or inside the periphery of the rotor hub annular base portion.

4. The rotor hub assembly as recited in claim 2, wherein one or more of the plurality of the arcuate segments axially overlap the periphery of the rotor hub annular base portion.

5. The rotor hub assembly as recited in claim 1, wherein the resilient member includes a plurality of axial segments disposed radially between the mounting plate and the periphery of the rotor hub annular base portion.

6. The rotor hub assembly as recited in claim 5, wherein one or more of the plurality of axial segments overlaps a portion of the periphery of the rotor hub annular base portion.

7. The rotor hub assembly as recited in claim 5, wherein one or more of the plurality of axial segments is disposed external of or internal to the periphery of the rotor hub annular base portion.

8. The rotor hub assembly as recited in claim 1, wherein one or more of the resilient members includes a plurality of radial segments disposed radially between the mounting plate and the periphery of the rotor hub annular base portion.

9. The rotor hub assembly as recited in claim 8, wherein one or more of the plurality of radial segments overlaps the periphery of the rotor hub annular base portion.

10. The rotor hub assembly as recited in claim 8, wherein one or more of the plurality of radial segments is disposed external of or internal to the periphery of the rotor hub annular base portion.

11. The rotor hub assembly as recited in claim 1, wherein the resilient member includes a foot segment connected to the periphery of the rotor hub annular base portion and disposed radially outward of the mounting plate.

12. The rotor hub assembly as recited in claim 1, wherein the mounting plate includes a plurality of apertures extending through the mounting plate.

13. The rotor hub assembly as recited in claim 1, wherein the resilient member is a first resilient member, and further including a second resilient member connected to the mounting plate on a side of the mounting plate opposite the first resilient member.

14. A rotary wing aircraft, comprising:
an airframe; and
a rotor system rotatably supported by the airframe for rotation about a rotation axis, the rotor system including:
a rotor shaft arranged along the rotation axis;
an open rotor hub connected to the rotor shaft including:
an annular base portion with a periphery; and
a plurality of rotary member portions arranged about the periphery of the annular base portion, each rotary member portion defining an aperture for receiving a rotor blade; and
a mounting plate comprising a central aperture a plurality of resilient members, the mounting plate spanning the annular base portion and coupled to the annular base portion by a plurality of resilient members, each of the plurality of resilient members being configured to expand and contract in a radial direction with respect to the central aperture with the annular base portion according to the dynamic loading of the rotor hub.

* * * * *

UNITED STATES PATENT AND TRADEMARK OFFICE
CERTIFICATE OF CORRECTION

| | | |
|---|---|---|
| PATENT NO. | : 10,501,174 B2 | Page 1 of 1 |
| APPLICATION NO. | : 15/406206 | |
| DATED | : December 10, 2019 | |
| INVENTOR(S) | : Stephen Johnston and James McCollough | |

It is certified that error appears in the above-identified patent and that said Letters Patent is hereby corrected as shown below:

On the Title Page

Inventor name at (72):
"James Mccollough" should read -- James McCollough --

Signed and Sealed this
Twenty-eighth Day of July, 2020

Andrei Iancu
*Director of the United States Patent and Trademark Office*